United States Patent [19]
Vasconcellos

[11] Patent Number: 6,003,074
[45] Date of Patent: Dec. 14, 1999

[54] METHOD AND APPARATUS FOR MAPPING THE PHYSICAL TOPOLOGY OF A SUBNETWORK

[75] Inventor: Brett W. Vasconcellos, Boise, Id.

[73] Assignee: Hewlett-Packard Company, Palo Alto, Calif.

[21] Appl. No.: 09/030,572

[22] Filed: Feb. 24, 1998

[51] Int. Cl.$^6$ ........................................... A63F 9/22
[52] U.S. Cl. ................................. 709/220; 370/254
[58] Field of Search .................... 709/220, 221, 709/223, 224, 238, 239, 242, 245; 370/254, 255, 256, 351

[56] References Cited

U.S. PATENT DOCUMENTS

| | | | |
|---|---|---|---|
| 5,293,635 | 3/1994 | Faulk, Jr. et al. | 709/224 |
| 5,297,138 | 3/1994 | Black | 370/254 |
| 5,481,674 | 1/1996 | Mahavadi | 395/200.11 |
| 5,588,119 | 12/1996 | Vincent et al. | 395/200.15 |
| 5,684,796 | 11/1997 | Abidi et al. | 370/389 |
| 5,708,772 | 1/1998 | Zeldin et al. | 714/25 |
| 5,727,157 | 3/1998 | Orr et al. | 709/224 |
| 5,793,975 | 8/1998 | Zeldin | 709/224 |
| 5,883,621 | 3/1999 | Iwamura | 345/327 |

Primary Examiner—Moustafa M. Meky

[57] ABSTRACT

The method of the invention enables a mapping of devices that are interconnected in a subnetwork between a first node and a second node. Initially, the method determines a subnetwork that includes both the first and second nodes and devices comprising the subnetwork. Next, the method determines a list of devices in the subnetwork which have seen traffic from the first node, and port identities on which the traffic has been experienced. Using such information, the method derives a map between the first node and the second node by (i) selecting a first intermediate device from the list of such devices and placing the intermediate device in the map between the first and second nodes. A second intermediate device is then selected and if it has seen traffic on a same port from the first intermediate device and the second node, it is placed between the first intermediate device and the first node. Otherwise, it is placed between the first intermediate device and the second node. Next, one or more other intermediate devices are selected and if any one has seen traffic on a same port from another intermediate device and the second node, it is placed between the "another" intermediate device and the first node. Otherwise, it is placed between the "another" intermediate device and the second node. The process is repeated until no further intermediate device remains to be considered, at which time, a map has been constructed of devices connecting the first and second nodes.

8 Claims, 3 Drawing Sheets

METHOD AND APPARATUS FOR MAPPING THE PHYSICAL TOPOLOGY OF A SUBNETWORK

FIELD OF THE INVENTION

This invention relates to a method and apparatus for mapping network topologies and, more particularly, to application of such method and apparatus to a rapid and efficient mapping of a subnetwork which resides between a router and a user node.

BACKGROUND OF THE INVENTION

When a problem condition arises in a local area network or other subnetwork, it is generally the responsibility of the network administrator to find and rectify the problem. One of the more difficult aspects of accomplishing such a task is to specifically identify devices which comprise the subnetwork that connects the user device from which the problem was reported, to a router which interfaces with a larger network. Various software products are available to the network administrator to assist in identifying devices which populate discrete network levels.

For example, "OpenView", a software product marketed by the Assignee of this application, runs on a network administrator's work station and periodically queries routers to identify all devices that are connected to each router port. The OpenView product thus acquires, from each router, identification of hubs and switches which connect to specific router ports and the identity of the ports. The OpenView product, however, does not provide information regarding connections (or data traffic) between hub and switch ports and connected processor nodes. Further, switch to node message traffic associations are generally not considered in the construction of the association data structures within the OpenView product.

A further product of Assignee, i.e., LanProbe (with a node locator option) determines the physical layout of a segment of a network, but requires special hardware to be installed on the segment and is operational only with coaxial cabling arrangements.

U.S. Pat. No. 5,588,119 to Vincent et al. describes a method for correlating logical device names with a hub port in a local area network (LAN). More specifically, Vincent et al. describe a method for dynamically correlating the logical name of a resource with a hub port that is used for communication by the named resource. Whenever the physical topology of the network is changed, the correlation information is automatically updated. Vincent et al. indicate that their invention enables the network administrator to manage a larger number of resources and that their correlation method avoids the problem of erroneous manually created data entries.

U.S. Pat. No. 5,481,674 to Mahavadi discloses a method for generating a physical topology map of an FDDI network. Mahavadi commences by first selecting a port which feeds a controller whose external connectivity is unknown. The network management station then determines an upstream neighbor controller of the external controller that is fed by the selected port. The network management station continues, operating in an upstream manner, to determine the network topology.

There is need for a network mapping tool which enables ready identification of a network's topology between a user node and a network interface, such as a router, so as to enable fault isolation therebetween.

Accordingly, it is an object of this invention to provide an improved network mapping method and apparatus which enables ready identification and mapping of devices that are connected between a user node and a network interface device.

It is another object of this invention to provide an improved method and apparatus for deriving a subnetwork map wherein device interconnections are readily identified by a positional sort procedure to enable a path between a user node and a router to be identified.

SUMMARY OF THE INVENTION

The method of the invention enables a mapping of devices that are interconnected in a subnetwork between a first node and a second node. Initially, the method determines a subnetwork that includes both the first and second nodes and devices comprising the subnetwork. Next, the method determines a list of devices in the subnetwork which have seen traffic from the first node, and port identities on which the traffic has been experienced. Using such information, the method derives a map between the first node and the second node by (i) selecting a first intermediate device from the list of such devices and placing the intermediate device in the map between the first and second nodes. A second intermediate device is then selected and if it has seen traffic on a same port from the first intermediate device and the second node, it is placed between the first intermediate device and the first node. Otherwise, it is placed between the first intermediate device and the second node. Next, one or more other intermediate devices are selected and if any one has seen traffic on a same port from another intermediate device and the second node, it is placed between the "another" intermediate device and the first node. Otherwise, it is placed between the "another" intermediate device and the second node. The process is repeated until no further intermediate device remains to be considered, at which time, a map has been constructed of devices connecting the first and second nodes.

DETAILED DESCRIPTION OF THE PREFERRED EMBODIMENT

Figure 1:
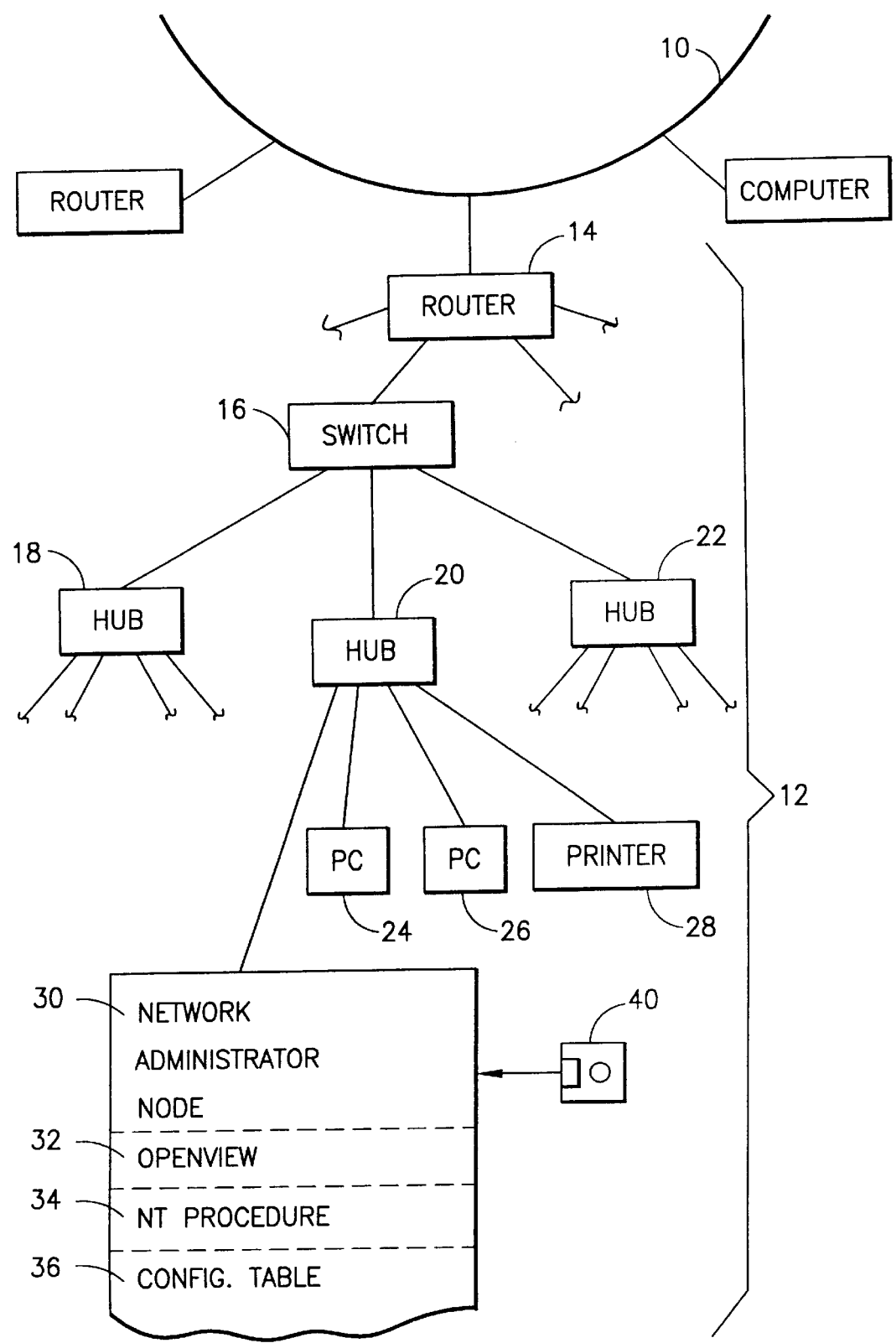
FIG. 1 is a block diagram illustrating a network and a network administrator computer that is employed to perform the method of the invention.

Referring now to FIG. 1, a wide area network 10 is interconnected to a local area network 12 (i.e., a subnetwork) via a router 14. Router 14 connects through one or more switches 16 to a plurality of hubs 18, 20, 22, etc. Each hub further connects to a plurality of user nodes which may be configured as personal computers (e.g. 24, 26), network printers (e.g. 28) or other devices. Subnetwork 12 is administered by a network administrator node 30 which, among other functions, performs the method of the invention. While network administrator node 30 is shown as connected into subnetwork 12, it is to be understood that its placement can be within any subnetwork, so long as communications are enabled with subnetwork 12.

Network administrator node 30 stores and executes the OpenView network configuration product 32 which enables acquisition of the identity of all devices connected to the specific ports of router 14. Network administrator node 30 further contains a network topology (NT) procedure 34 which, using data derived from OpenView product 32, enables generation of a configuration table 36 that identifies all devices physically connected between a particular node within subnetwork 12 and router 14.

While OpenView product 32, NT procedure 34 and configuration table 36 are shown in FIG. 1 as already loaded onto network administration node 30, such procedures and data structures may be contained on one or more storage devices, such as diskette 40. Accordingly, the operation of network administration node 30 can be controlled by use of storage device 40, in combination with resident memory that is positioned within node 30.

Communications between network administrator node 30 and the remaining devices within subnetwork 12 are preferably handled using the SNMP (simple network management protocol) to communicate management information between itself and the devices on subnetwork 12. Such protocol enables the acquisition of data necessary for performing network management, including derivation of network configuration data.

Assume now that a user at personal computer (PC) 26 experiences a problem in subnetwork 12 which connects it to router 14. The user then reports the problem to the network administrator sitting at node 30. The network administrator must now identify the source of the problem. Because the configuration of subnetwork 12 is subject to change as a result of reconfiguration actions, device malfunctions, etc., it is inefficient at network administrator node 30, to continually maintain a full network configuration mapping between each node in subnetwork 12 and every other device in the subnetwork. More precisely, subnetwork 12 may comprise several thousand connected computers, printers and other devices which are coupled through tens of hubs, and switches to router 14, and a detailed mapping thereof would require large amounts of memory, which only infrequently would be subject to use. Accordingly, it is preferred that a device-to-router mapping be produced only at a time of need, such as when a malfunction is reported or suspected.

Figure 2A:
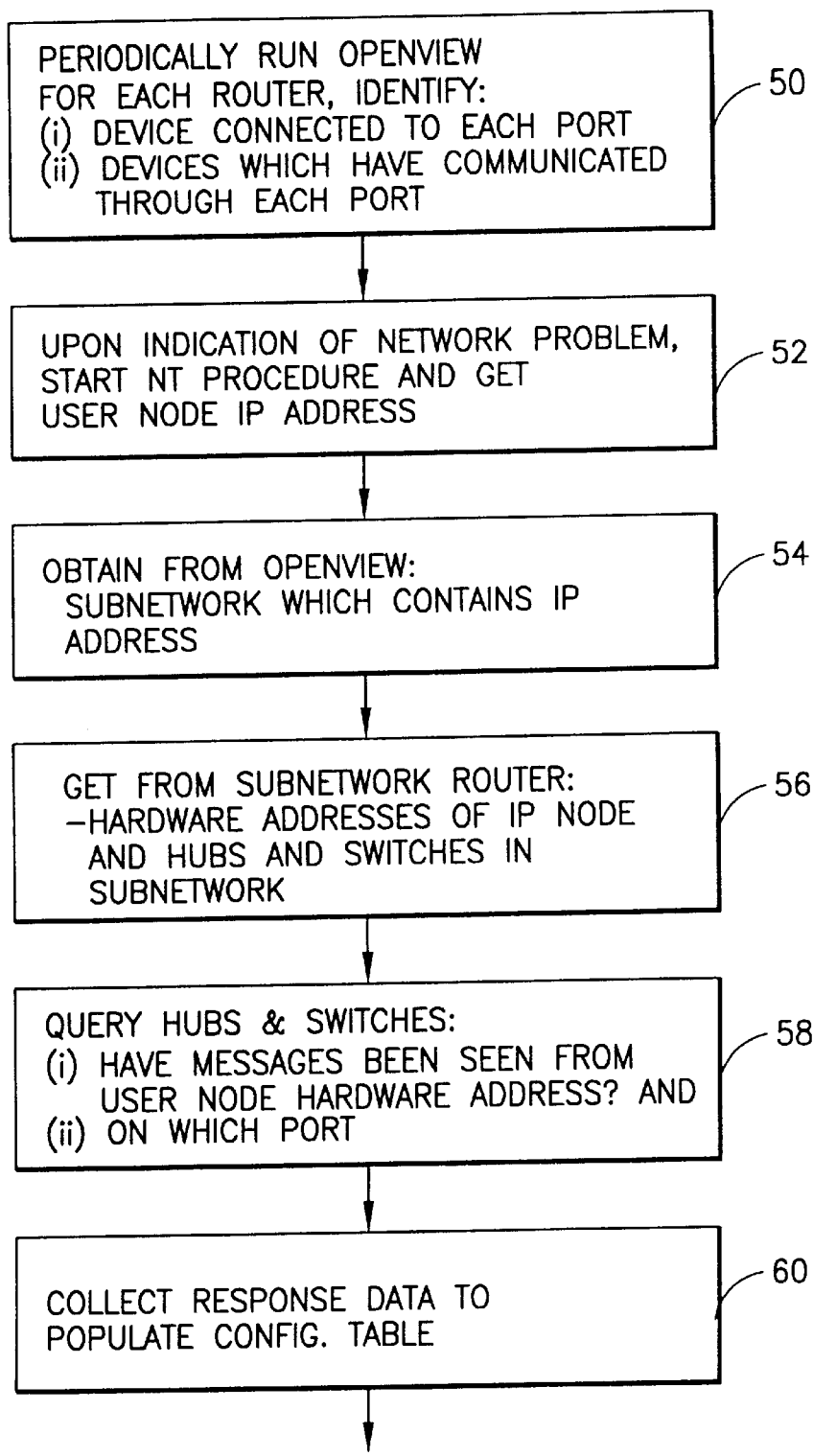
FIGS. 2a and 2b illustrate a logical flow diagram which further describes the method of the invention.
Figure 2B:
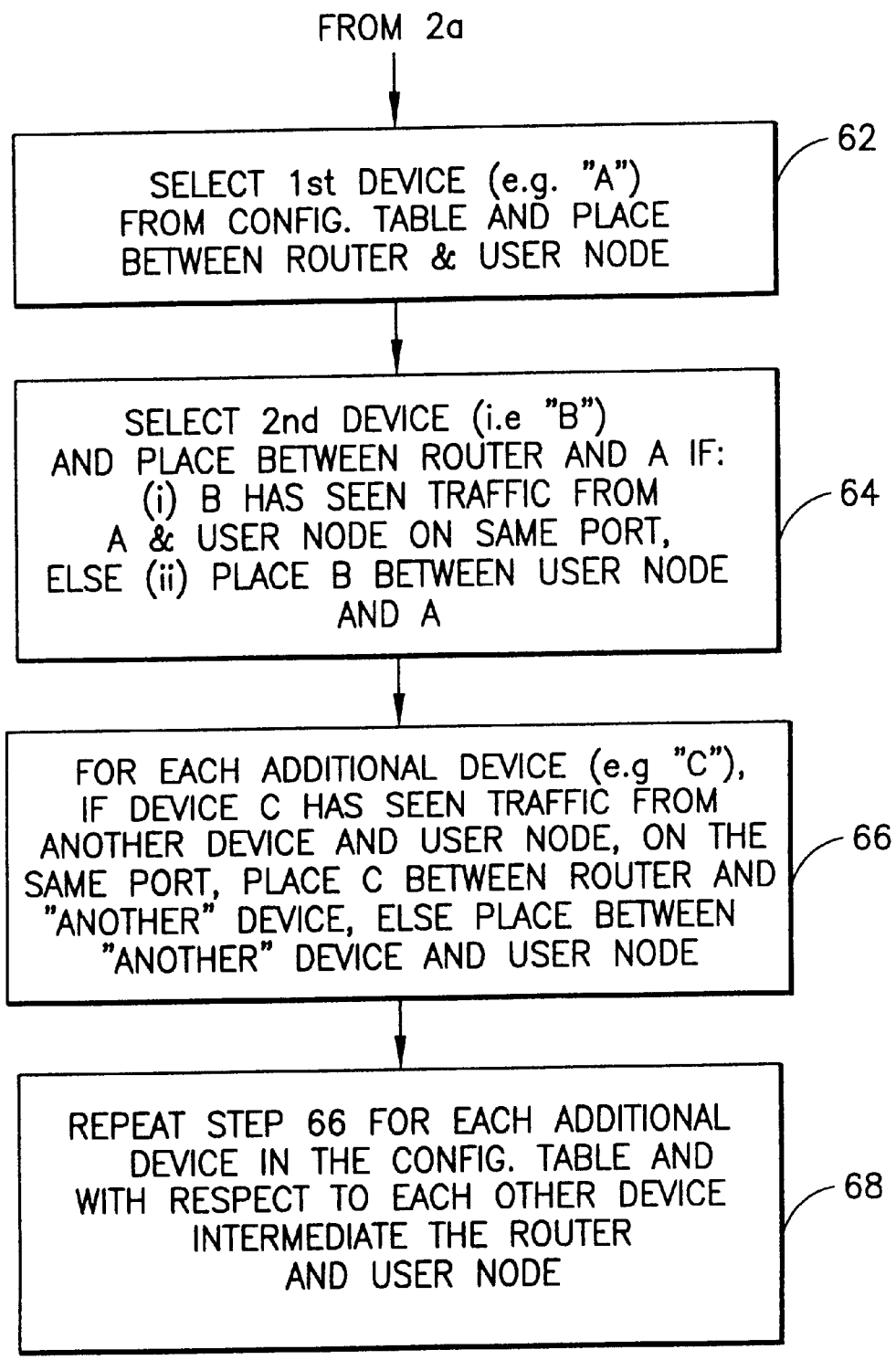

Turning now to FIGS. 2a and 2b, the method of the invention will be described which enables network administration node 30 to rapidly derive a map between, for example, node 26 and router 14. Network administration node 30 periodically runs the OpenView product which determines, for router 14, the identity of each device connected to each port of router 14, devices which have sent messages through each such port and the identity of each such port (step 50). Accordingly, an updated listing is maintained of the devices that are directly connected to router 14, devices which communicate through router 14, and the ports on router 14 through which they communicate.

Thereafter, upon indication of a network problem from an user node, the network administrator invokes NT procedure 34 and inputs the "IP" address of computer 26. As known to those skilled in the art, an IP address is a logical address that is unique and specifies both a subnetwork and specific device with which it is associated. However, to proceed to determine intermediate network devices which connect node 26 to router 14, a machine address is required for node 26, because devices positioned between router 14 and node 26 employ machine addresses in inter-device communications.

Accordingly, NT procedure 34 obtains from OpenView procedure 32 an identification of the subnetwork which contains node 26 (step 54). Thereafter, given the subnetwork's identity, NT procedure 34 dispatches a message to the router which forms the gateway between subnetwork 12 and network 10, in this case router 14 (step 56). Router 14 provides a hardware address that corresponds to the IP address for node 26, as well as machine addresses for all devices which form portions of subnetwork 12, having gathered that data previously under control of OpenView product 32.

Next, NT procedure 34 queries all of the identified hubs and switches in subnetwork 12 with the following queries: (i) "Have any messages been experienced from a device having the hardware address of node 26?"; and (ii) "On which port of the respective hub/switch was the message detected?" (step 58). The hubs and switches which have experienced such message traffic respond to network administration node 30 with identification of their ports which have detected such messages. NT procedure 34 collects such response data and constructs configuration table 36, using the list of hubs and switches, and ports thereof, which have seen messages from node 26 (step 60).

NT procedure now knows of each of the hubs and switches (i.e., intermediate devices) which have experienced message traffic from/to node 26. Further, it is known that such switches and hubs lie between node 26 and router 14. However, what is not known is the sequence of connections between the various intermediate devices which form the connection path between node 26 and router 14.

It is to be here noted that FIG. 1 indicates a simplified network configuration wherein there is only one switch and one hub between node 26 and router 14. In medium to large size subnetworks, there may be a multiplicity of each of the aforesaid devices lying between node 26 and router 14. Accordingly, to determine the appropriate subnetwork map of devices between node 26 and router 14, a positional sort procedure is now performed.

Referring to step 62, NT procedure 34 now begins to configure a list of devices falling between node 26 and router 14. Initially, the list comprises a topmost entry for router 14 and a bottommost entry for node 26. NT procedure 34 selects one of the intermediate devices (e.g., device A) listed in configuration table 36 and places it in the list between node 26 and router 14 (as schematically shown below, where R=router 14, N=node 26 and A=device A) (step 62). The list then schematically appears as follows:

NT procedure 36 next selects a second device ("B") from configuration table 36 and, based upon the following determination, places device B either between device A and router 14 or between device A and node 26 (step 64). More specifically, device B is placed between node 26 and device A, if device B has seen traffic from both device A and router 14 on a same port. Otherwise, device B is placed between device A and router 14. This placement is illustrated as follows:

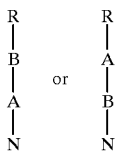

The logic which underlies this placement procedure is that if device B has seen messages on a same port from a previously placed device in the list and one of the end devices of the list (e.g., either router 14 or node 26), then the newly placed device (B) must lie between the other end device of the list and the intermediate device against which the comparison is being made.

As shown in step 66, the above placement procedure is repeated for each additional intermediate device listed in configuration table 36. More specifically, if an additional device (C) has seen traffic from another intermediate device, e.g. device B, and node 26 on a same port, then device C is placed between device B and router 14. Otherwise, it is placed between device B and node 26. For example, if device A saw B and N on the same port, and device C saw B and N on the same port, but A on a different port, the placement is illustrated as follows:

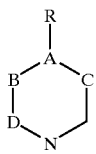

For each additional intermediate device added to the list, the intermediate device is positionally tested, as above indicated, against every other intermediate device within the list so as to determine its proper placement within the list (step 68). For example, for each device D, if D has seen traffic from another intermediate device and node 26 on the same port, device D is placed between that intermediate device and router 14, otherwise D is placed between that intermediate device and node 26.

The procedure described above works with networks which have at most one path from a router to a node, and can be extended to build more complex physical layouts, e.g.:

In the above example, device A see traffic from B, D, and N on one port, traffic from D and N again on another port and from the router on still a third port.

When all devices from configuration table 36 have been considered, and subjected to the above indicated procedure, configuration table 36 includes a map (i.e., list) which identifies each of the intermediate devices lying between node 26 and router 14 and their sequence of placement therebetween. Accordingly, NT procedure 34 provides an output to the network administrator identifying the specific mapping of the devices. This enables further troubleshooting actions to be carried out to enable identification of a trouble point in the network.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. A method for enabling a mapping of devices that are interconnected between a first node and a second node, the method comprising the steps of:
   a) determining a subnetwork that includes said first node and said second node, and devices comprising said subnetwork;
   b) determining a list of devices in said subnetwork, (i) which have seen traffic from said first node and (ii) port identities on which said traffic has been experienced; and
   c) deriving a map between said first node and said second node by (i) selecting a first device from said list and placing said device between said first node and said second node in said map, (ii) selecting a second device and, if said second device has seen traffic on a same port from said first device and said second node, placing said second device between said first device and said first node, else, between said first device and said second node, (ii) selecting one or more other device(s) and if any said other device have seen traffic on a same port from another device and said second node, placing said other device between said another device and said first node, else between said another device and said second node and (iii) repeating step c(ii) until no further devices remain to be considered.

2. The method as recited in claim 1 wherein step c(ii) is repeated for each combination of said other device(s) and each remaining device residing between said first node and said second node.

3. The method as recited in claim 1 wherein said second node is a network router.

4. The method as recited in claim 3 wherein said first node is a user's computer that is connected to the subnetwork.

5. A memory media for controlling a computer to map devices that are interconnected between a first node and a second node, said memory media comprising:
   a) means for controlling said computer to determine a subnetwork that includes said first node and said second node, and devices comprising said subnetwork;
   b) means for controlling said computer to determine a list of devices in said subnetwork, (i) which have seen traffic from said first node and (ii) port identities on which said traffic has been experienced; and
   c) means for controlling said computer to derive a map between said first node and said second node by (i) selecting a first device from said list and placing said device between said first node and said second node in said map, (ii) selecting a second device and if, said second device has seen traffic on a same port from said first device and said second node, placing said second device between said first device and said first node, else, between said first device and said second node, (ii) selecting one or more other device(s) and if any said other device has seen traffic on a same port from another device and said second node, placing said other device between said another device and said first node, else between said another device and said second node, and (iii) repeating step c(ii) until no further devices remain to be considered.

6. The memory media as recited in claim 5 wherein means c) repeats the selecting action (ii) for each combination of said other device(s) and each remaining device residing between said first node and said second node.

7. The memory media as recited in claim 5, wherein said second node is a network router.

8. The memory media as recited in claim 7 wherein said first node is a user's computer that is connected to the subnetwork.

* * * * *